(12) United States Patent
Pan

(10) Patent No.: US 10,928,943 B2
(45) Date of Patent: Feb. 23, 2021

(54) TOUCH DISPLAY DEVICE

(71) Applicant: WUHAN CHINA STAR OPTOELECTRONICS TECHNOLOGY CO., LTD., Hubei (CN)

(72) Inventor: Pengpeng Pan, Wuhan (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 0 days.

(21) Appl. No.: 16/476,037

(22) PCT Filed: Apr. 4, 2019

(86) PCT No.: PCT/CN2019/081611
§ 371 (c)(1),
(2) Date: Jul. 3, 2019

(87) PCT Pub. No.: WO2020/191810
PCT Pub. Date: Oct. 1, 2020

(65) Prior Publication Data
US 2020/0310574 A1 Oct. 1, 2020

(30) Foreign Application Priority Data

Mar. 27, 2019 (CN) .......................... 201910239386.4

(51) Int. Cl.
*G06F 3/041* (2006.01)
*G06F 3/044* (2006.01)

(52) U.S. Cl.
CPC .......... *G06F 3/0412* (2013.01); *G06F 3/0443* (2019.05)

(58) Field of Classification Search
CPC ... G06F 3/0412; G06F 3/0443; G06F 3/04164
See application file for complete search history.

(56) References Cited

U.S. PATENT DOCUMENTS

| | | | | |
|---|---|---|---|---|
| 2014/0132873 A1* | 5/2014 | Ogasawara | ........... | G02F 1/1309 349/43 |
| 2017/0285823 A1* | 10/2017 | Pan | ................... | G02F 1/133514 |
| 2018/0120994 A1* | 5/2018 | Yoo | ........................ | G06F 3/047 |
| 2018/0188584 A1* | 7/2018 | Yeh | ........................ | G02F 1/1339 |
| 2019/0138128 A1* | 5/2019 | Hwang | ................ | G06F 3/0443 |

* cited by examiner

*Primary Examiner* — Alexander Eisen
*Assistant Examiner* — Kebede T Teshome

(57) ABSTRACT

A touch display device is provided, which includes a substrate, multiple touch electrodes arranged in an array on the substrate, and multiple touch lines on the substrate. The touch lines are arranged in a layer different from a layer in which the touch electrodes are positioned. The touch electrodes are arranged corresponding to the touch lines respectively. Each touch line is arranged parallel to a column direction of the touch electrodes. Each touch line includes a signal transmission portion. One end of the signal transmission portion of each touch line is connected to a corresponding one of the touch electrodes, another end of the signal transmission portion of each touch line is extended in a same direction to outside an area where the touch electrodes are positioned. Such configuration reduces a risk of short-circuiting between the touch lines and data lines in the same layer to ensure good production yields.

7 Claims, 5 Drawing Sheets

TOUCH DISPLAY DEVICE

FIELD OF DISCLOSURE

The present invention relates to a field of display devices and in particular, to a touch display device.

DESCRIPTION OF RELATED ART

As an important indicator of smart technology, touch technology has become more and more extensively used and has been developed rapidly. According to different touch operation principles, touch technology can be categorized into piezoresistive, optical, and capacitive types. Among them, capacitive touch technology has been developed for many years and is the most extensively used one. Capacitive touch technology can be roughly classified into an add-on type, an on-cell type, and an in-cell type.

Nowadays, in-cell touch display panels are more and more used in electronic display devices such as mobile phones. The in-cell touch display panel integrates the touch and display functions, and the touch sensor is disposed between a thin film transistor array substrate (commonly referred to as a TFT Array Substrate) and a color filter (CF), so that while ensuring good touch sensitivity, touch display products are also thinner and lighter with better optical display performance. Furthermore, the touch and display driver circuits can be integrated into one chip to thereby realize low costs in mass production.

Please refer to FIG. 1 which is a schematic structural view of a conventional touch display device. The touch display device includes a substrate 100, a plurality of touch electrodes 200 disposed on the substrate 100 and arranged in an array, a touch and display driver integrated circuit chip (TDDI IC) 300 disposed on the substrate 100 and outside a region where the touch electrodes 200 are positioned, a plurality of touch traces 400 disposed on the substrate 100 and disposed in a layer different from a layer in which the touch electrodes 200 are positioned, and a plurality of data lines 500. The touch traces 400 and the data lines 500 are disposed in a same layer, and the touch traces 400 and the data lines 500 are arranged parallel to a column direction of the touch electrodes 200. The touch traces 400 have a same length. Each of the touch traces 400 is connected to a corresponding one of the touch electrodes 200 through a via hole 600. Each touch trace 400 has a continuous structure, and all the touch traces 400 are connected to a common voltage. The touch traces 400 and the data lines 500 are both positioned in the same layer and are close to each other, so short-circuiting tends to occur, and the common voltage in the touch trace 400 may lower a voltage of the data line 500, thereby causing poor display performance and affecting production yields. Please refer to FIG. 1, except the touch trace 400 disposed corresponding to the touch electrodes 200 of one row farthest from the touch and display driver integrated circuit chip 300, all the touch traces 400 each include a signal transmission portion 410 between a corresponding one of the touch electrodes 200 and the touch and display driver integrated circuit chip 300, and all the touch traces 400 also each include a redundant portion 420 other than the signal transmission portion 410. The presence of the redundant portions 420 significantly increase a risk of short-circuiting between the touch traces 400 and the data lines 500.

SUMMARY

It is an objective of the present invention to provide a touch display device which can reduce a risk of short-circuiting between touch lines and data lines and improve production yields.

Accordingly, the present invention provides a touch display device, comprising:

a substrate;

a plurality of touch electrodes disposed on the substrate and arranged in an array; and a plurality of touch lines disposed on the substrate;

wherein the touch lines are disposed in a layer different from a layer in which the touch electrodes are disposed, the touch electrodes are disposed corresponding to the touch lines respectively, each of the touch lines is arranged parallel to a column direction of the touch electrodes, each of the touch lines comprises a signal transmission portion, one end of the signal transmission portion of each of the touch lines is connected to a corresponding one of the touch electrodes, and another end of the signal transmission portion of each of the touch lines is extended in a same direction to outside an area where the touch electrodes are positioned.

The touch display device further comprises a touch and display driver integrated circuit chips disposed on the substrate and arranged outside the area where the touch electrodes are positioned, wherein the another end of the signal transmission portion of each of the touch lines is connected to the touch and display driver integrated circuit chip.

Excluding the touch electrodes of one row farthest from the another end of the signal transmission portion of each of the touch lines, each of the touch lines disposed corresponding to a respective corresponding one of the touch electrodes further comprises a redundant portion extending from the one end of the signal transmission portion of each of the touch lines to a direction away from the another end of the signal transmission portion of each of the touch lines, and each of the redundant portions further comprises a plurality of sub-redundant portions disposed spaced apart.

Each of the touch lines has a same length.

One end of the signal transmission portion of each of the touch lines is connected to a corresponding one of the touch electrodes through at least one via hole.

One end of the signal transmission portion of each of the touch lines is provided with at least one connection terminal, and each of the at least one connection terminal of one end of the signal transmission portion of each of the touch lines is connected to a corresponding one of the touch electrodes through a via hole.

One end of the signal transmission portion of each of the touch lines is connected to a corresponding one of the touch electrodes through three via holes.

The three via holes are arranged in a direction the same as the column direction of the touch electrodes.

The touch display device further comprises a plurality of data lines disposed on the substrate, and the data lines and the touch lines are disposed in the same layer, wherein each of the data lines is parallel to the column direction of the touch electrodes.

The touch lines and the data lines are made of metal, the touch electrodes are made of indium tin oxide (ITO), and each of the touch electrodes has a rectangular shape.

The present invention has advantages as follows.

The touch display device comprises:

a substrate;

a plurality of touch electrodes disposed on the substrate and arranged in an array; and a plurality of touch lines disposed on the substrate;

wherein the touch lines are disposed in a layer different from a layer in which the touch electrodes are disposed, the touch electrodes are disposed corresponding to the touch lines respectively, each of the touch lines is arranged parallel to a column direction of the touch electrodes, each of the touch lines comprises a signal transmission portion, one end of the signal transmission portion of each of the touch lines is connected to a corresponding one of the touch electrodes, and another end of the signal transmission portion of each of the touch lines is extended in a same direction to outside an area where the touch electrodes are positioned. Such configuration can effectively reduce a risk of short-circuiting between the touch lines and the data lines arranged in the same layer to thereby ensure good production yields.

BRIEF DESCRIPTION OF DRAWINGS

In order to further understand the features and technical contents of the present invention, a detailed description of the invention is provided with reference to the accompanying drawings. However, the accompanying drawings are illustrative only and not intended to limit the invention. In the drawings.

DETAILED DESCRIPTION OF EMBODIMENTS

In order to further clarify the technical means and functions of the present invention, embodiments of the present invention are described in detail with reference to the accompanying drawings as follows.

Figure 1:
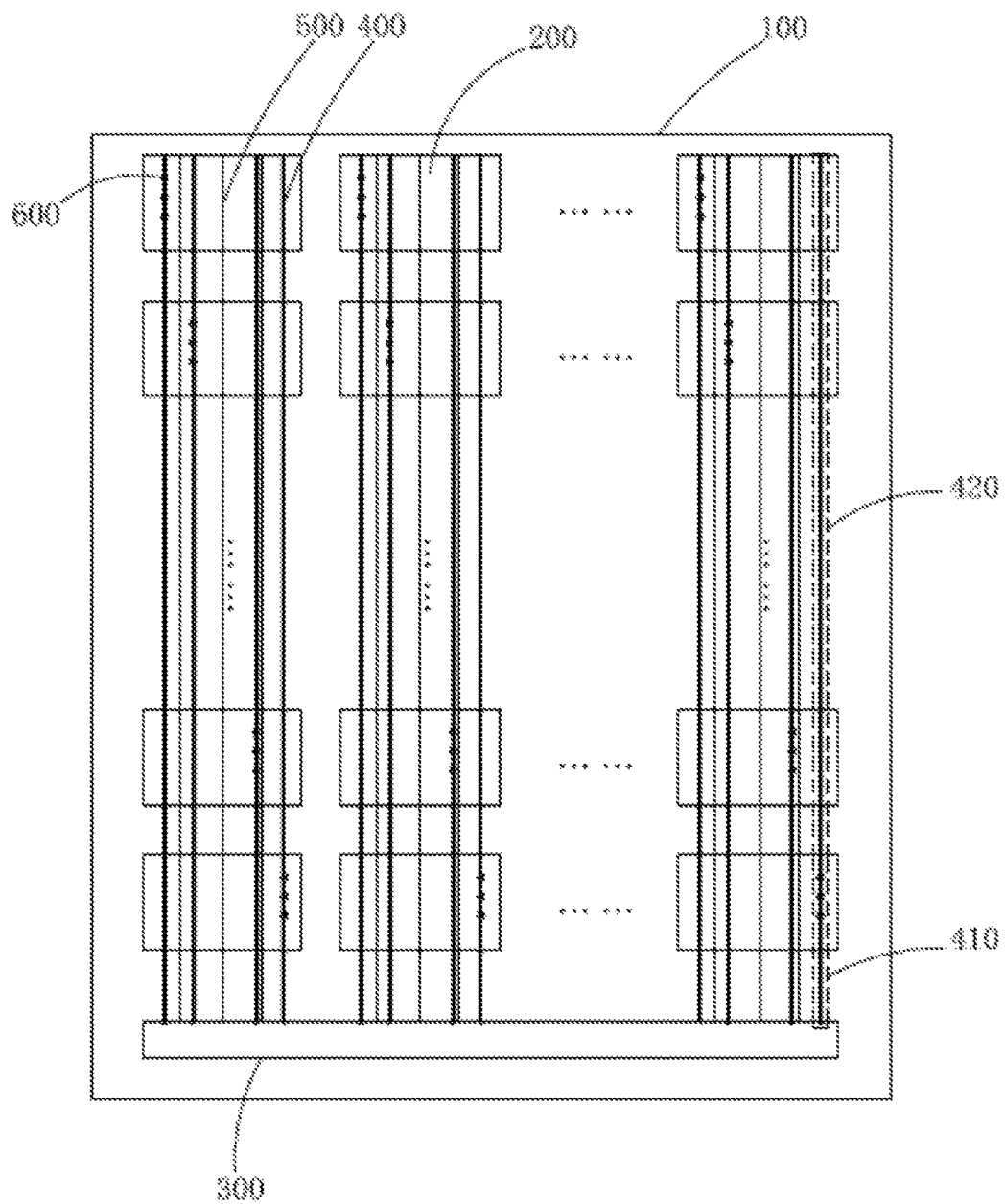
FIG. 1 is a schematic structural view illustrating a conventional touch display device.
Figure 2:
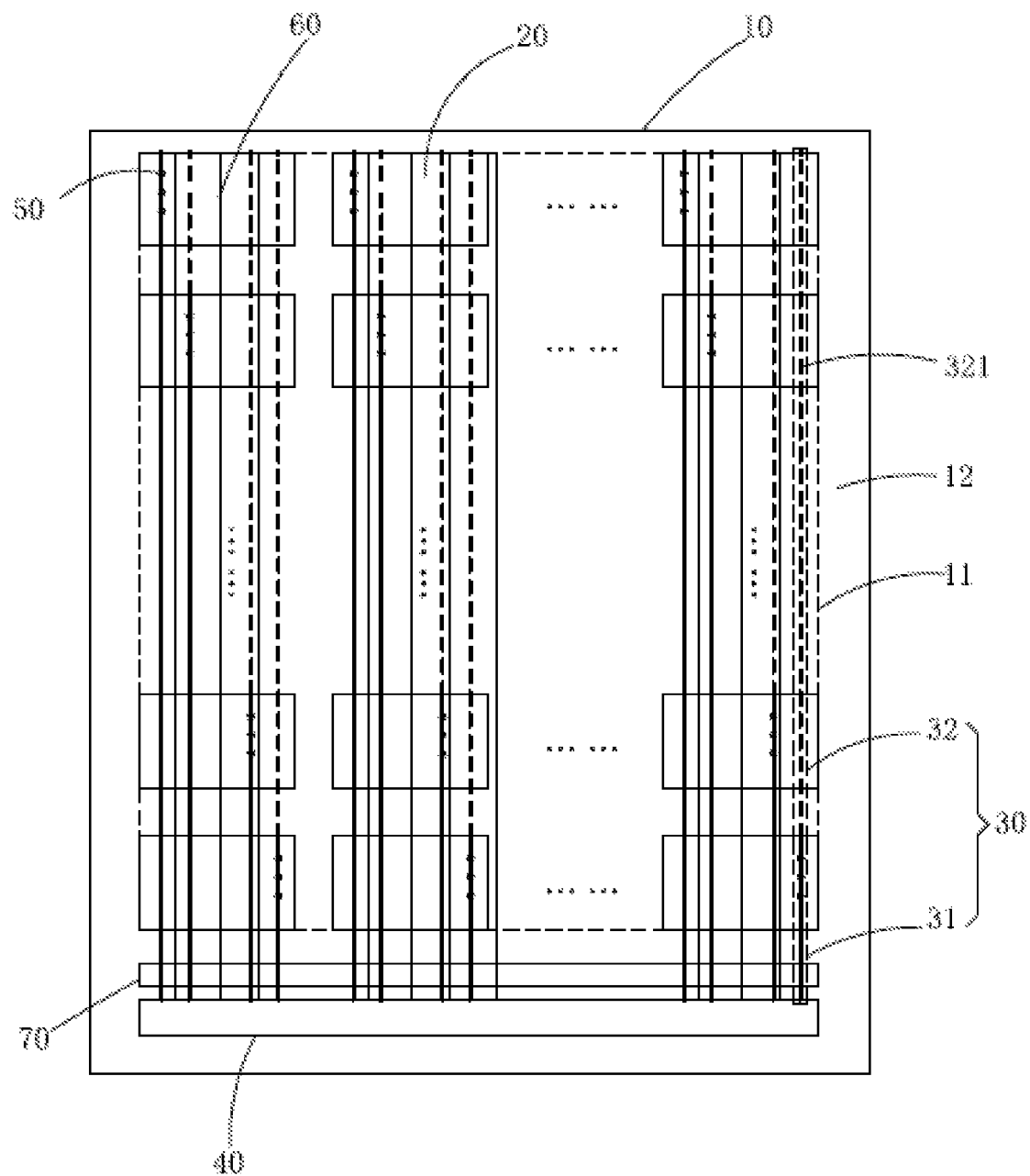
FIG. 2 is a schematic structural view illustrating a touch display device according to a first embodiment of the present invention.
Figure 3:
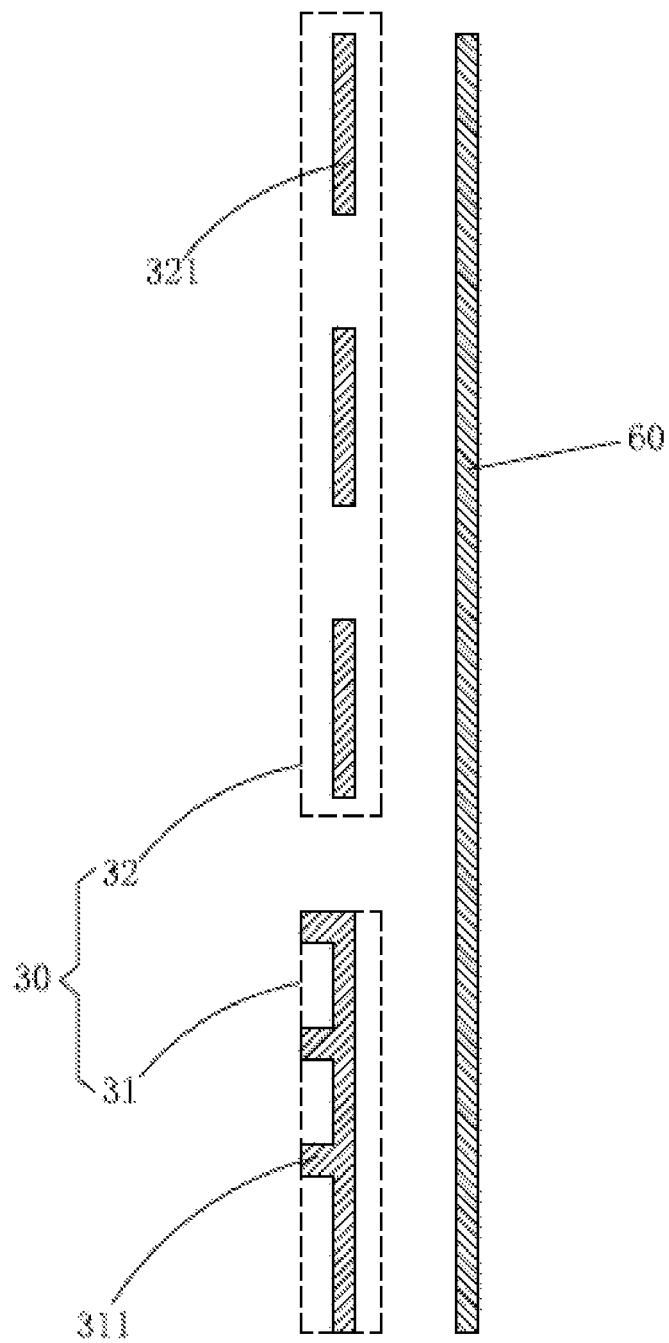
FIG. 3 is a schematic partial view illustrating touch lines and data lines of the touch display device according to the first embodiment of the present invention.

Referring to FIGS. 2 and 3, the present invention provides a touch display device according to a first embodiment of the present invention, the touch display device comprising:

a substrate 10;

a plurality of touch electrodes 20 disposed on the substrate 10 and arranged in an array; and a plurality of touch lines 30 disposed on the substrate 10;

wherein the touch lines 30 are disposed in a layer different from a layer in which the touch electrodes 20 are disposed, the touch electrodes 20 are disposed corresponding to the touch lines 30 respectively, each of the touch lines 30 is arranged parallel to a column direction of the touch electrodes 20, each of the touch lines 30 comprises a signal transmission portion 31, one end of the signal transmission portion 31 of each of the touch lines 30 is connected to a corresponding one of the touch electrodes 20, and another end of the signal transmission portion 31 of each of the touch lines 30 is extended in a same direction to outside an area where the touch electrodes 20 are positioned. The another end of the signal transmission portion 31 of each of the touch lines 30 is connected to a touch and display driver integrated circuit chip 40. Each of the data lines 60 is parallel to the column direction of the touch electrodes 20.

To be specific, the substrate 10 comprises an effective display region 11 and a peripheral region 12 outside the effective display region 11. All the touch electrodes 20 are in the effective display region 11. The touch and display driver integrated circuit chip 40 is disposed in the peripheral region 12.

According to the first embodiment of the present invention shown in FIGS. 2 and 3, excluding the touch electrodes 20 of one row farthest from the another end of the signal transmission portion 31 of each of the touch lines 30, each of the touch lines 30 disposed corresponding to a respective corresponding one of the touch electrodes 20 further comprises a redundant portion 32 extending from the one end of the signal transmission portion 31 of each of the touch lines 30 to a direction away from the another end of the signal transmission portion 31 of each of the touch lines 30, and each of the redundant portions 32 further comprises a plurality of sub-redundant portions 321 disposed spaced apart.

It is preferable that each of the touch lines 30 has a same length.

Referring to FIG. 2, in detail, one end of the signal transmission portion 31 of each of the touch lines 30 is connected to a corresponding one of the touch electrodes 20 through at least one via hole 50.

Furthermore, referring to FIG. 3, one end of the signal transmission portion 31 of each of the touch lines 30 is provided with at least one connection terminal 311, each of the at least one connection terminal 311 of one end of the signal transmission portion 31 of each of the touch lines 30 is connected to a corresponding one of the touch electrodes 20 through a via hole 50.

Referring to FIGS. 2 and 3, preferably, one end of the signal transmission portion 31 of each of the touch lines 30 is connected to a corresponding one of the touch electrodes 20 through three via holes 50. One end of the signal transmission portion 31 of each of the touch lines 30 is provided with three connection terminals 311, each connection terminal 311 is connected to a corresponding one of the touch electrodes 20 through one of the via holes 50. The three via holes 50 are arranged in a direction the same as the column direction of the touch electrodes 20. Therefore, connection reliability between the touch electrodes 20 and the touch lines 30 is improved.

To be specific, the touch lines 30 and the data lines 60 are made of metal.

In detail, the touch electrodes 20 are made of indium tin oxide (ITO), and each of the touch electrodes 20 has a rectangular shape.

Referring to FIG. 2, in detail, the touch display device further comprises a touch test module 70 disposed on the substrate 10 and between an area where the touch electrodes 20 are positioned and the touch and display driver integrated circuit chip 40. The touch test module 70 is disposed in the peripheral region 12.

Specifically, the touch display device further comprises a plurality of pixels (not illustrated) arranged in an array and a plurality of scan lines (not illustrated). Each of data lines 60 is electrically connected to a column of the pixels, and each of the scan lines is electrically connected to a row of the pixels.

Furthermore, when the touch display device is in touch operation, the touch and display driver integrated circuit chip 40 transmits a common voltage to the touch lines 30.

Moreover, the touch lines 30 and the data lines 60 are formed at the same time by performing a yellow light process on an electrode material film.

Figure 4:
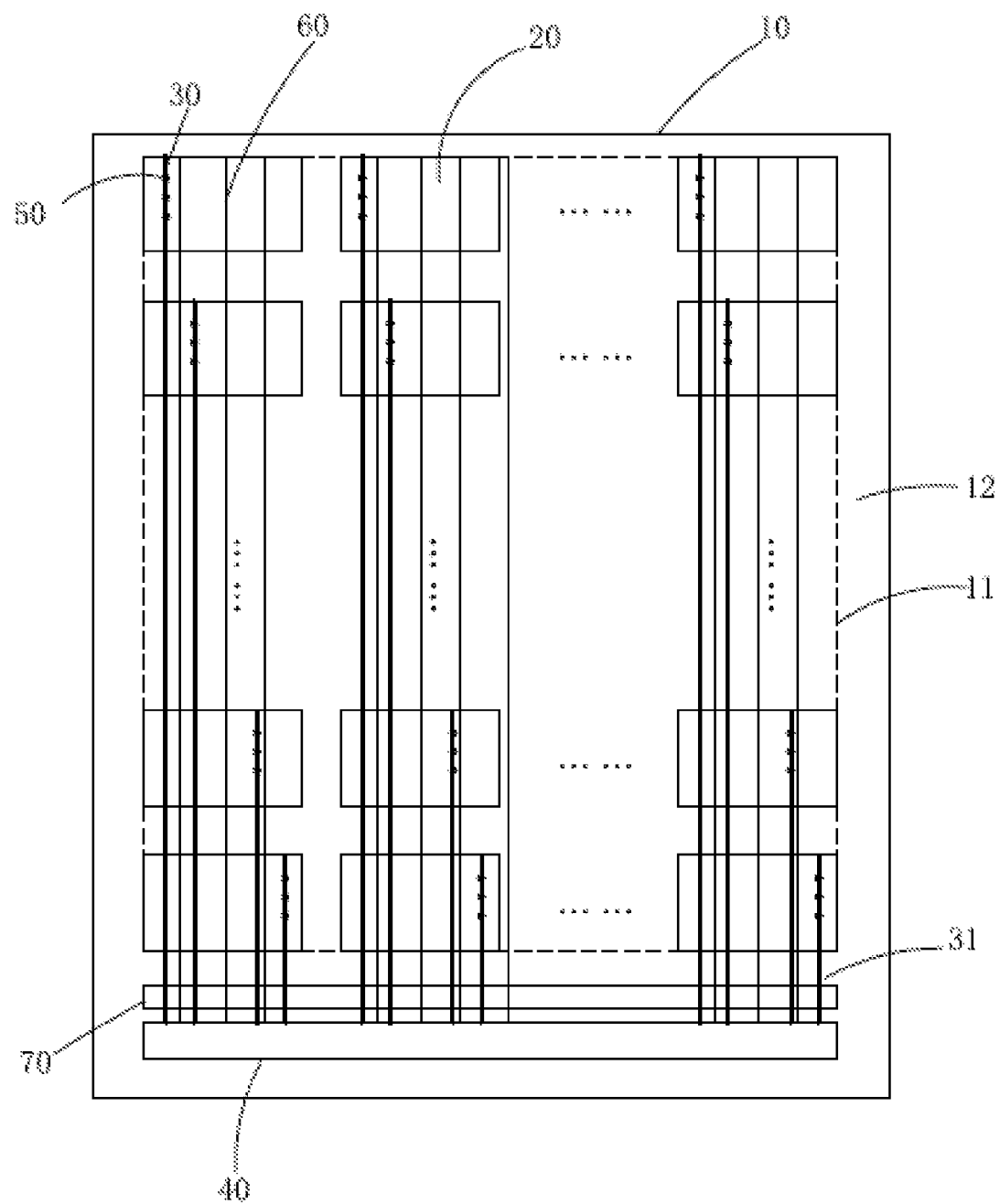
FIG. 4 is a schematic structural view illustrating the touch display device according to a second embodiment of the present invention.
Figure 5:
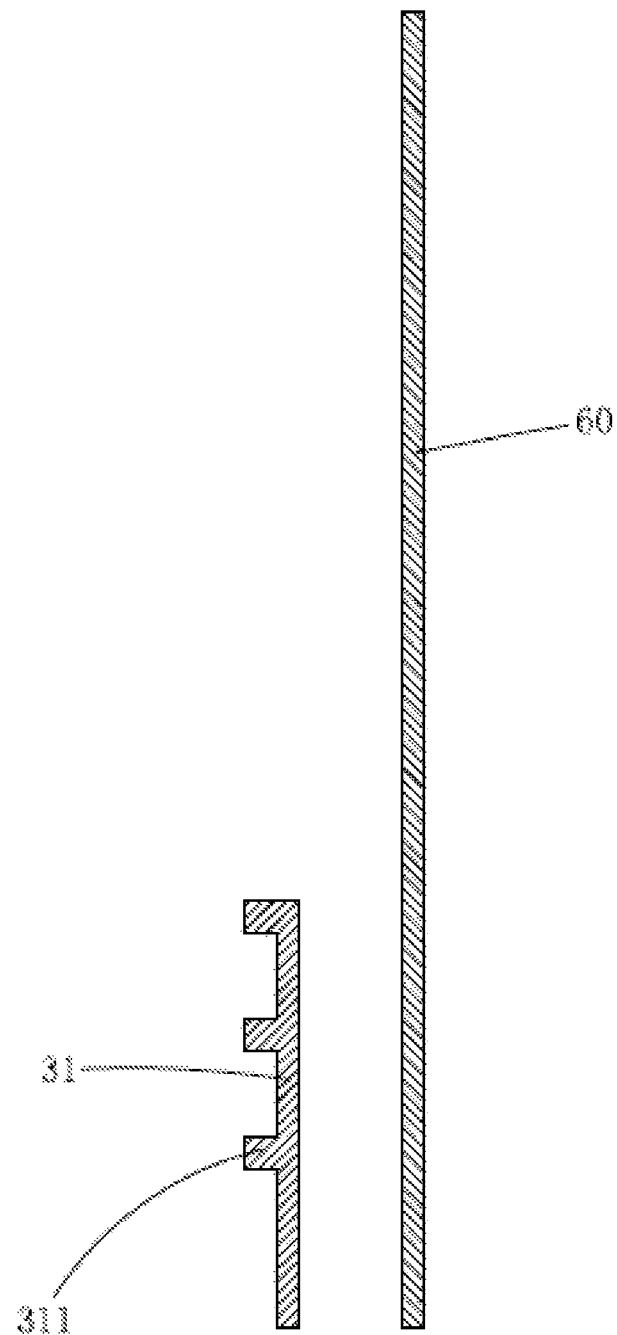
FIG. 5 is a schematic partial view illustrating the touch lines and the data lines of the touch display device according to the second embodiment of the present invention.

Please refer to FIGS. 4 and 5 illustrating the touch display device according to a second embodiment of the present invention. The touch display device of the second embodiment is different from the foregoing first embodiment in that, each of the touch lines 30 includes only the signal transmission portion 31, and the redundant portion is removed, and the rest details are the same as those of the first embodiment, so a detailed description thereof is not repeated herein for brevity.

It should be noted that, in the touch display device of the first embodiment of the present invention, each touch line 30 connects a corresponding one of the touch electrodes 20 to the touch and display driver integrated circuit chip 40 by using the signal transmission portion 31, and the redundant portion 32 of each touch line 30 consists of a plurality of sub-redundant portions 321 which are arranged spaced apart. Therefore, when touch operations are performed, even if short circuit occurs between the redundant portions 32 and the data lines 60 in the same layer 30, and the touch lines 30 do not lower voltages of the data lines 60. Compared with the touch display device of the first embodiment of the present invention, each touch line 30 of the touch display device of the second embodiment comprises only the signal transmission portion 31, and the redundant portion is directly removed, so that there is no problem that the redundant portion is short-circuited with the data line 60, and thereby the present invention can significantly reduce a risk of short-circuiting between the touch lines 30 and the data lines 60. It has been verified that, a defect ratio caused by short-circuiting between the touch lines and the data lines is 4.2% in prior art, but the present invention can reduce the defect ratio to 2.08%. The present invention shows remarkable improvement, and good production yields are ensured.

In summary, the touch display device of the present invention comprises:
   a substrate;
   a plurality of touch electrodes disposed on the substrate and arranged in an array; and
   a plurality of touch lines disposed on the substrate;
   wherein the touch lines are disposed in a layer different from a layer in which the touch electrodes are disposed, the touch electrodes are disposed corresponding to the touch lines respectively, each of the touch lines is arranged parallel to a column direction of the touch electrodes, each of the touch lines comprises a signal transmission portion, one end of the signal transmission portion of each of the touch lines is connected to a corresponding one of the touch electrodes, and another end of the signal transmission portion of each of the touch lines is extended in a same direction to outside an area where the touch electrodes are positioned. Such configuration can effectively reduce the risk of short-circuiting between the touch lines and the data lines arranged in the same layer to thereby ensure good production yields.

It is to be understood that the above descriptions are merely the preferable embodiments of the present invention and are not intended to limit the scope of the present invention. Equivalent changes and modifications made in the spirit of the present invention are regarded as falling within the scope of the present invention.

What is claimed is:

1. A touch display device, comprising:
   a substrate comprising an effective display region and a peripheral region outside the effective display region;
   a plurality of touch electrodes disposed in the effective display region and arranged in an array; and
   a plurality of touch lines disposed in the effective display region;
   wherein the touch lines are disposed in a layer different from a layer in which the touch electrodes are disposed, the touch electrodes are disposed corresponding to the touch lines respectively, each of the touch lines is arranged parallel to a column direction of the touch electrodes, each of the touch lines comprises a signal transmission portion, one end of the signal transmission portion of each of the touch lines is connected to a corresponding one of the touch electrodes, and another end of the signal transmission portion of each of the touch lines is extended in a same direction to outside an area where the touch electrodes are positioned;
   wherein each of the touch lines disposed corresponding to a respective corresponding one of the touch electrodes further comprises a redundant portion extending in a direction from the signal transmission portion of each of the touch lines to away from the signal transmission portion of each of the touch lines, and each of the redundant portions further comprises a plurality of sub-redundant portions disposed spaced apart; and
   wherein the one end of the signal transmission portion of each of the touch lines is connected to the corresponding one of the touch electrodes through at least one via hole, the one end of the signal transmission portion of each of the touch lines is provided with at least one connection terminal, and each of the at least one connection terminal of the one end of the signal transmission portion of each of the touch lines is connected to the corresponding one of the touch electrodes through the at least one via hole.

2. The touch display device according to claim 1, further comprising a touch and display driver integrated circuit chips disposed on the substrate and arranged outside the area where the touch electrodes are positioned, wherein the another end of the signal transmission portion of each of the touch lines is connected to the touch and display driver integrated circuit chip.

3. The touch display device according to claim 1, wherein each of the touch lines has a same length.

4. The touch display device according to claim 1, wherein the one end of the signal transmission portion of each of the touch lines is connected to the corresponding one of the touch electrodes through three via holes.

5. The touch display device according to claim 4, wherein the three via holes are arranged in a direction the same as the column direction of the touch electrodes.

6. The touch display device according to claim 1, further comprising a plurality of data lines disposed on the substrate, and the data lines and the touch lines are disposed in the same layer, wherein each of the data lines is parallel to the column direction of the touch electrodes.

7. The touch display device according to claim 6, wherein the touch lines and the data lines are made of metal, the touch electrodes are made of indium tin oxide (ITO), and each of the touch electrodes has a rectangular shape.

* * * * *